Patented Nov. 26, 1929

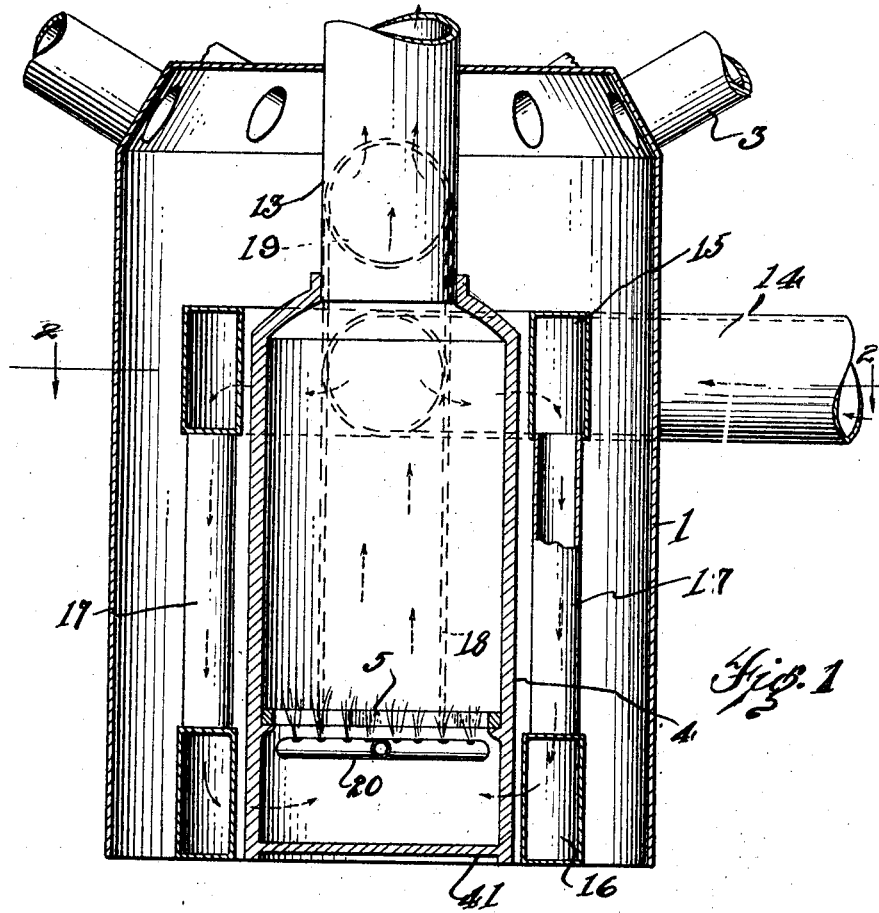
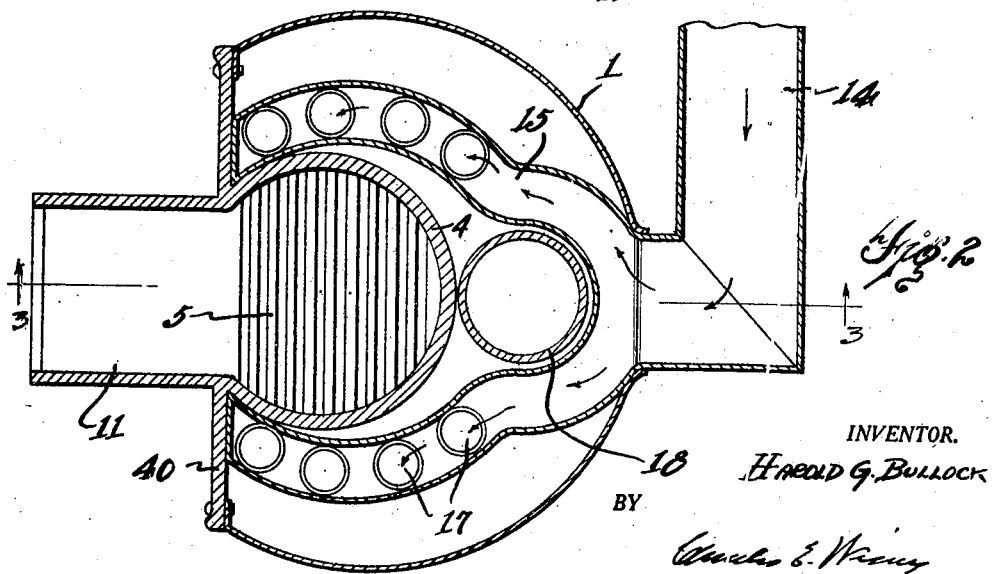

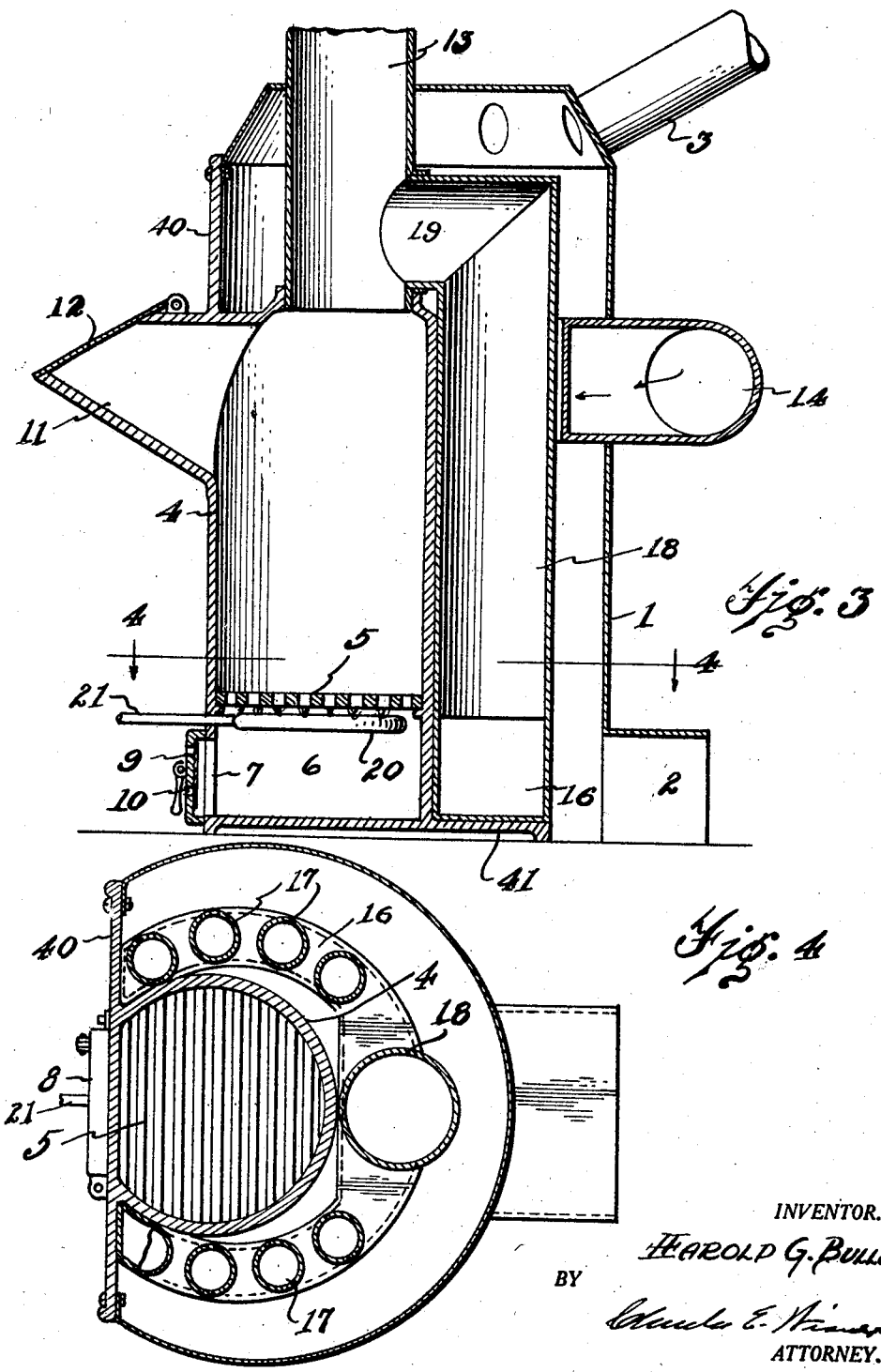

1,736,963

UNITED STATES PATENT OFFICE

HAROLD G. BULLOCK, OF FLINT, MICHIGAN

COMBINED INCINERATOR AND FUEL ECONOMIZER

Application filed April 27, 1928. Serial No. 273,189.

This invention relates to combined incinerators and and fuel economizers, and the object of the invention is to provide an incinerator in which refuse material of the household including garbage may be burned and the heat therefrom utilized in the heating of the house which is directly heated by a furnace of the ordinary type, the exhaust flue of which is led to about the incinerator to dry the refuse deposited therein preparatory to burning and the said furnace exhaust flue discharging to the exhaust flue of the incinerator which in turn discharges to atmosphere.

It is commonly the practice to install an incinerator for the general purpose herein described for ready disposition of refuse but such installations are either independent of the heating plant or built in adjacent to the brick furnace flue and in which the refuse is dried and burned but in such previous constructions the heat developed in the incinerator is lost and no economy results so far as the heating of the house or building is concerned.

This invention seeks to provide a combined incinerator and fuel economizer to which the smoke flue of a furnace is connected and utilized to dry the material of the incinerator and this heat of the exhaust gases from the furnace as well as the heat developed in the intermittent burning of the refuse is employed in the heating of an air body for instance which may be discharged to the rooms of the building directly heated by the furnace.

In the embodiment of the invention herein disclosed heated air is provided by this combined incinerator and fuel economizer to discharge to a building for heating purposes but this is only one exemplification of use of the generic invention—that is, the heat may be utilized in any desired manner it being possible to discharge the heated air to areas unheated by the furnace or to so revise the construction as to heat water for use in heating rooms or other areas. In its broadest aspect therefore the object of the invention is to provide an apparatus of the character described in which the heat of the exhaust gases of the furnace are utilized to dry refuse material and with the heat developed in the refuse to heat an element to be utilized in any desired manner. The preferred embodiment of the invention is shown in the accompanying drawings in which—

Fig. 1 is a vertical section of my improved incinerator and fuel economizer.

Fig. 2 is a cross section taken on line 2—2 of Fig. 1.

Fig. 3 is a vertical section taken on line 3—3 of Fig. 2.

Fig. 4 is a cross section taken on line 4—4 of Fig. 3.

The combined incinerator and fuel economizer is, in the construction here shown, similar to a hot air furnace it having an outer casing 1 having an opening to atmosphere at the bottom indicated at 2 and hot air outlet flues 3 at the top.

Within the shell is the incinerator proper indicated at 4 having an ordinary burning grate 5 adjacent the bottom and an ash pit 6 therebelow. There is an opening 7 through the wall of the incinerator closed by a door 8 providing access to the ash pit with which is associated a damper plate 9 for opening or closing the apertures 10 of the door to vary the draft condition. This incinerator is practically cylindrical in form as will be understood from Figs. 2 and 4 and has near its top on the front side an inlet chute 11 covered by a hinged door 12 and through which refuse may be introduced into the incinerator 4. At the top the incinerator is contracted and an exhaust flue 13 is provided therefor. The front of the incinerator includes a vertical plate 40 of greater width than the incinerator serving as a front wall to which outer casing 1 is attached as understood in Figs. 2 and 4. Extending between two headers 15 and 16 are a series of vertical flues 17, 17. This lower header 16 has at the rear side of the incinerator a single large exhaust flue 18 approximately equal in diameter to the diameter of the furnace flue 14. This flue 14 is to be understood as an ordinary smoke flue of a heating plant or furnace, the heat of the exhaust gases of which it is desired to conserve but it may be any flue through which heated exhaust gases pass. The flue 18 extends vertically upward at the rear of the incinerator passing between the arms of the header 15 as shown in Fig. 2 and, as will be understood from Fig. 3, is connected directly into the incinerator flue 13 at 19. With this arrangement the exhaust gases from the furnace, which may be of any approved type, pass through the flue 14 into the upper header 15 and thence downwardly through the flues 17 to the header 16 at the bottom and thence upwardly through the flue 18 and at 19 pass into the incinerator flue 13 leading to atmosphere.

Thus, in normal operation of the furnace of a building connected with the exhaust flue 14 the heat of the exhaust gases is utilized in the drying of material in the incinerator and also is utilized to heat the air body in the casing 1. This casing is open at the bottom at the point 2 to a flow of air thereinto and the conduits 3 provide for flow of air therefrom. This arrangement provides a means for causing a fluid element, for instance air, to flow in close association with the incinerator and the heated exhaust gas flues. This air body is additionally heated at each time the incinerator is fired so that by my arrangement I utilize the exhaust heat of the furnace for heating or other purposes as well as the heat produced by the burning of refuse in the incinerator. The exhaust gases of the incinerator pass directly outward through a flue 13 as does also all odors of garbage deposited in the incinerator. Thus by my arrangement the drying of refuse, such as garbage, does not detrimentally effect the atmosphere of the building in which the incinerator-economizer is installed. The incinerator structure may be of any desired form and may be fired as by means of a gas burner 20 positioned below the grate 5 of the incinerator and supplied by means of a gas line 21 shown in Fig. 3.

Simplicity and inexpensiveness of construction is an additional object to be secured by my invention it not being bricked in as as is commonly the case with many types of incinerators. The labor of installation is therefore reduced to a minimum and the outer shell may be of the usual galvanized iron as is used in furnaces in such cases where it is desired to heat air but if a different element is to be heated the structure may be changed accordingly.

In recapitulation, it is pointed out that the incinerator 4 is surrounded to a major extent by the upper and lower headers 15 and 16, the connecting flues 17, and the flue 18 all of which forms a continuation of the flue 14 for the heated exhaust gases of a furnace or other structure and through which the heated gases pass on their way to the incinerator exhaust flue 13 and thence to atmosphere. The purpose of providing these headers and flues 15, 16, 17 and 18 in close association with the incinerator is to provide a means for heating the incinerator to dry material deposited therein through the inlet 11 previous to the burning of the refuse. Means is also provided in conjunction with the incinerator and the flues for heated gases thereabout for heating a fluid element and transferring the same to a distance from the device. In the structure shown this means is provided by the casing 1 and the flues 3 leading therefrom. The casing being open to atmosphere at the bottom at the point 2 and the flues being open, air may flow into the casing and heated air may flow therefrom.

This casing 1 is similar to that of an ordinary hot air furnace in this respect that the casing is spaced from the heating element providing an air space. Thus the heat of the exhaust gases passing through the flue 14 to atmosphere through the incinerator flue 13 is utilized as well as the heat generated by the burning of refuse in the incinerator and it is an essential characteristic of this invention to provide a means in conjunction with the exhaust flues and incinerator to heat a fluid element and to transfer the heated element to a distance.

Having thus briefly described my invention what I claim and desire to secure by Letters Patent of the United States is—

1. In apparatus of the character described, the combination with a smoke flue of a furnace, of an incinerator adapted for the introduction and burning of refuse, an exhaust flue for the incinerator, a series of exhaust flue conduits contiguous to the incinerator into which the furnace smoke flue discharges, the exhaust flues about the incinerator communicating with the exhaust flue of the incinerator, a casing about the incinerator and contiguous exhaust flues, a cold air inlet at the bottom of the casing, and an outlet for heated air at the top thereof.

2. In apparatus of the character described, the combination with a smoke flue of a furnace, of an incinerator adapted for the introduction and burning of refuse, an exhaust flue for the incinerator, and means for causing the gases of the furnace flue to pass about the exterior of the incinerator and thence to discharge to the incinerator exhaust flue, and means for causing a fluid element to flow in close association with the incinerator and the heated exhaust gas flues, and means for conveying the heated element to a distance from the incinerator.

3. In apparatus of the character described, the combination with a furnace flue for heated exhaust gases, of an incinerator adapted for the introduction and burning of refuse, a series of flues about the incinerator into which the exhaust gas flue of the furnace discharges, providing a means for heating the incinerator, an exhaust flue for the incinerator into which the flues about the incinerator discharge, and a gas burner for burning the refuse in the incinerator, means for causing a fluid element to flow about the incinerator and the series of flues thereabout to absorb the heat, and means for conveying the heated element to a distance from the incinerator.

4. In apparatus of the character described, the combination with a furnace flue for heated exhaust gases, of an incinerator adapted for the introduction and burning of refuse, an exhaust flue therefor, a series of flues about the incinerator including an upper and a lower header, the furnace flue discharging into the upper header, a flue extending from the lower header to the exhaust flue of the incinerator, a casing about the incinerator and said header and flues thereabout, a cold air inlet at the bottom of the casing, and a hot air outlet at the top thereof.

5. In apparatus of the character described, an incinerator having at its front an inlet at the top for refuse and an ash pit door at the bottom through which air may be introduced to the incinerator, a grate adjacent the bottom of the incinerator and an ash pit therebelow to which the ash pit door provides access, an exhaust flue extending from the top of the incinerator, a casing enclosing the incinerator with the exception of the said front side, an exhaust flue for the heated gases of a furnace extending into the casing, a conduit providing a continuation of the furnace exhaust flue positioned about the incinerator and discharging to the incinerator exhaust flue, a cold air inlet near the bottom of the said casing, and a hot air outlet at the top thereof.

6. In apparatus of the character described, an incinerator having on its front side near the top an inlet for refuse, a grate in the incinerator adjacent the bottom and an ash pit therebelow, there being a closable opening in the front side to the ash pit, said front side including a plate extending outwardly on each side of the incinerator, a series of vertical flues positioned about the incinerator, a header for the upper ends thereof and a header for the lower ends thereof supported by the said base, an exhaust gas flue of a furnace discharging into the upper header, a flue extending from the lower header and discharging into the exhaust flue of the incinerator and a casing extending about the incinerator and the said vertical flues and headers and connected with the said front plate thereof, providing an air enclosure, an air inlet for the said enclosure adjacent the bottom thereof, and an outlet for heated air at the top thereof.

In testimony whereof, I sign this specification.

HAROLD G. BULLOCK.